United States Patent [19]
Martinez et al.

[11] Patent Number: 6,109,521
[45] Date of Patent: *Aug. 29, 2000

[54] CHECK PROCESSING METHOD AND APPARATUS

[75] Inventors: Phillip M. Martinez, Groton; Kenneth Vought, Cortland, both of N.Y.

[73] Assignee: Axiohm Transaction Solutions, Inc., Bluebell, Pa.

[*] Notice: This patent is subject to a terminal disclaimer.

[21] Appl. No.: 08/944,154

[22] Filed: Oct. 6, 1997

[51] Int. Cl.⁷ .............................. G06F 17/60; G06K 7/08
[52] U.S. Cl. .............................. 235/379; 235/449; 902/18
[58] Field of Search .................................... 271/291, 301, 271/225; 347/104, 215; 235/379, 493, 436, 380, 449, 375

[56] References Cited

U.S. PATENT DOCUMENTS 4,541,334  9/1985  Liedtke et al. ..................... 101/93.18
5,865,547  2/1999  Harris et al. ............................. 400/578
5,934,193  8/1999  Menzenski ............................... 101/287

*Primary Examiner*—Thien M. Le
*Attorney, Agent, or Firm*—Salzman & Levy

[57] ABSTRACT

A new receipt printer and method for negotiating transactions at the point of sale in retail establishments. The POS printer includes means for reading the account and bank information from existing magnetic characters on a check. The apparatus of this invention flips the check over and reverses its feed direction, in order to change its facial and directional orientation so that the amount of the transaction or other accounting information can be printed on the check, with one check presentation operation. The clamshell design of the printer, with the transport mechanism disposed in a pivotable door, allows for ease of clearing paper jams, should they occur. The door itself has a window through which the user and customer can view the check at all times, as it is read, flipped, and printed on.

17 Claims, 9 Drawing Sheets

CHECK PROCESSING METHOD AND APPARATUS

FIELD OF THE INVENTION

This invention relates to a new point of sale (POS) printer and check processing method and, more particularly, to a new check flipping apparatus for processing a check in a clamshell POS receipt printer, that allows the check indicia to be read and allows the user to view the process through a window.

BACKGROUND OF THE INVENTION

In retail establishments, one of the problems with handling documents, such as checks, presented for payment at the point of sale receipt printer, is the need to reverse the face orientation of the check, and then re-introduce the check into the machine. In this context, the word "check" is meant to include, but not be limited to personal checks, payroll checks, business negotiable notes and European financial documents. The re-introduction step is performed for printing the amount of sale and possibly other information (bank codes, account numbers, etc.) on the check itself. This added step is wasteful of time and inconvenient for the operator. The present invention suggests that it is more useful, when printing MICR indicia on documents such as checks, for example, to accomplish this procedure in one presenting operation. In other words, it would be more convenient to present the check to the receipt printer only one time.

The present invention seeks to provide a new method and apparatus for processing checks at the point of sale, wherein each check need be introduced into the machine only once. In other words, this invention provides a mechanism that automatically reverses the face orientation of the check inside the machine. This allows for (1) reading account information on the check, while the front face of the check is downwardly oriented and facing the read head, (2) flipping the check over, and (3) printing the amount upon the check, while the front face of the check is upwardly oriented and in line with the internal printer.

It should be understood that the orientation of the check is dependent upon the positioning of the read head and printing mechanism. In other words, should the printer be located below the read head along the check processing path, then the front face of the check can be presented to the receipt printer with a face-up orientation. In such a case, the check face faces downwardly during printing.

This invention allows a retailer to save money and time in one or both of two ways:

(a) Having the POS printer of this invention, a retailer can read, verify and print characters in one operation. This saves the retailer money and time.

(b) Retailers having this POS printer need not purchase an encoding machine to encode the checks. Neither do they need to encode the checks as a separate task at a later time than that of the point of sale. The retailer having the POS printer of this invention saves the time and labor in performing this task at the point of sale, and not as a separate function performed at a later time.

It has been found that another concern is losing track of the check in the machine, during processing. This can be disconcerting to both retailer-operators and their customers. This lack of control, coupled with difficulty removing paper jams, when they occur, heretofore has made it almost impossible to produce and successfully sell check flipping apparatus in a POS printer. Previous apparatus, for example, have required the user to dismantle part of the machine, removing selected components thereof, in order to clear a paper jam.

SUMMARY OF THE INVENTION

In accordance with the present invention, there is provided a POS printer that includes an encoding module that magnetizes and reads account and bank information from existing magnetic characters on a check. The encoding module can also print the characters in the AMOUNT field of the check, according to APSIS, ISO, or other standards. The characters can be printed with an ink having magnetic particles embedded therein. The POS printer provides a mechanism that automatically reverses the face orientation of the check inside the machine. This allows for (1) reading the account information on the check, while the front face of the check is downwardly oriented and facing the read head, (2) flipping over the check, and (3) printing indicia upon the check, while the front face of the check is upwardly oriented, and in line with the internal printer. As aforementioned, the orientation of the read head and printer influences the orientation of how the check face is presented to the receipt printer of this invention.

The clamshell design of the printer, with the transport mechanism disposed in a pivotable door, allows for ease of clearing paper jams, should they occur. The door itself has a window through which the user and customer can view the check at all times, as it is read, flipped, and printed on.

The invention comprises a slip table for introducing a check into a receipt printer in order to read MICR indicia upon the check. The check travels forward over a read head where the account number and bank MICR numbers are read may be verified by internal electronics. Sensing means also measures the length of the document, as it is transported into the printer. This measurement is later used to facilitate further paper handling operations. Thereafter, the check travels backwardly. A trap door disposed along the check feed path diverts the check after the read step has been performed by the read head and electronics of the machine. The check is diverted into a reversing mechanism that flips the check over, and reverses the direction of the check. The check is again fed forward, where it encounters the print mechanism. The amount of the sale and/or other accounting information is printed upon the check, and then the direction of the check is again reversed. The check is discharged back to the slip table of the machine. The check may also be endorsed as well as encoded with the MICR indicia in the printing operation.

The method of the invention has the POS printer following a certain sequence of actions in order to accomplish the reading, verification, and printing of the check at the point of sale. First, the ROUTING and ON-US fields of the check are magnetized, either by a fixed magnet, or within the read head itself. Next, the characters within the ROUTING and ON-US fields are read by the read head, and the signals analyzed by the electronics of the POS printer. These steps are then optionally followed by a verification to determine whether the customer's check is good. The printer can continue to either endorse the check on the back face and/or encode the check by printing MICR characters in the AMOUNT field on the front face of the check, if verification is successful.

It is an object of this invention to provide a new POS receipt printer and method.

It is another object of the invention to provide a POS printer and method for reading, verifying and printing MICR characters upon a check all in one step.

It is a further object of the invention to provide a POS printer of a clamshell design, in which the mechanism for transporting and flipping the check is disposed in a pivotable door, providing easy access to the document in the case of paper jam.

It is a yet a further object of the invention to provide a POS printer having check flipping capabilities and a window for allowing the operator to view the check during the paper handling process.

It is also an object of the invention to provide a POS printer having means for determining the length of the document as it is entered into the printer, in order to facilitate the document flipping and, optionally, printing operations.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a new receipt printer and method for negotiating transactions at the point of sale in retail establishments. The POS printer includes means for reading the account and bank information from existing magnetic characters on a check. After the read operation is accomplished, the apparatus of this invention flips the check over and reverses its feed direction, in order to change its facial and directional orientation. The amount of the transaction and/or other accounting information can then be printed on the check. The receipt printer can print the characters in the AMOUNT field of the check, according to APSIS, ISO, or other standards. For purposes of clarity and brevity, like elements and components will bear the same number throughout the figures.

Figure 1:
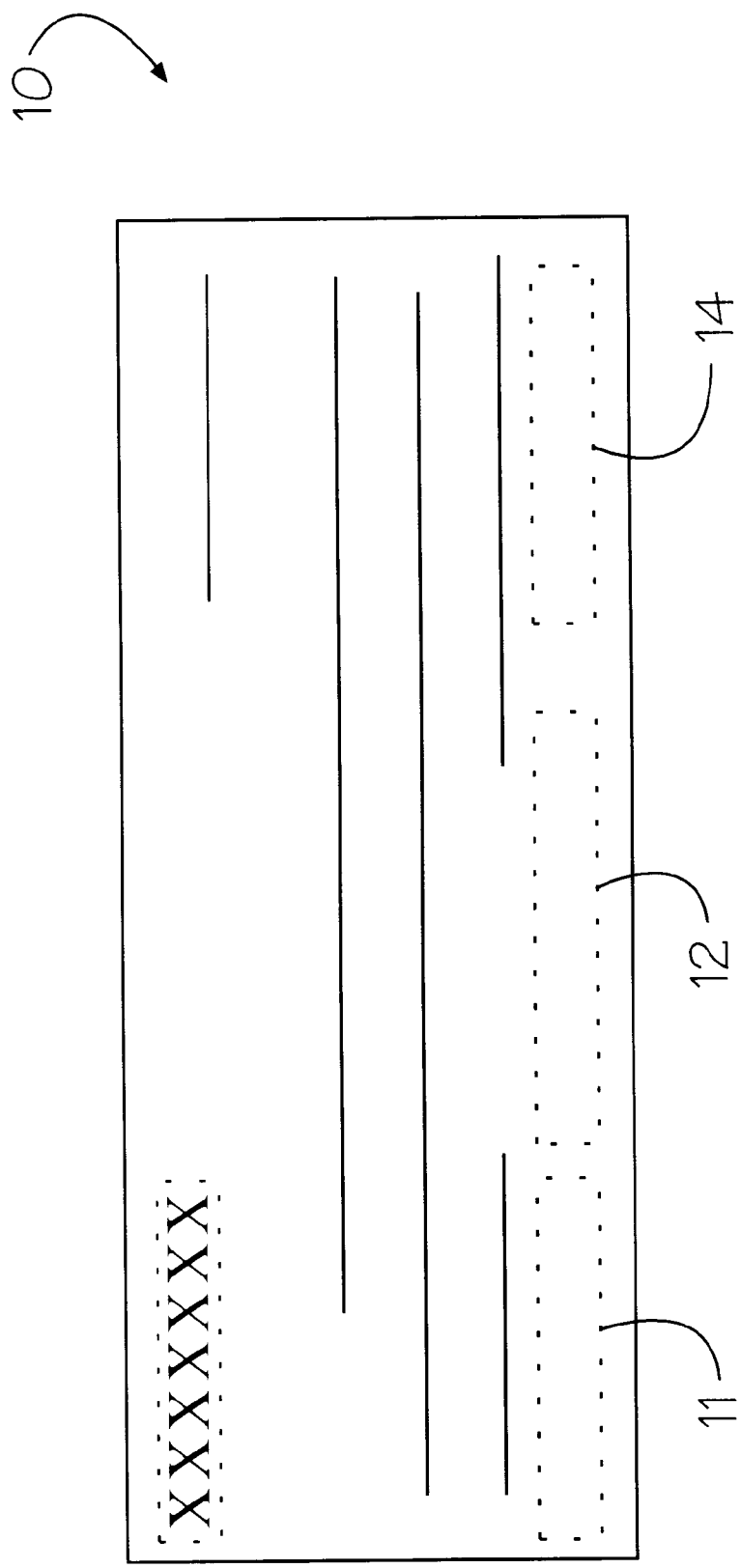
FIG. 1 illustrates a plan view of a typical personal check used at a point of sale transaction.

Now referring to FIG. 1, a typical personal check 10 is shown in plan view. The exact location of various fields of check 10 is defined in ANSI and ISO specifications. The ROUTING and ON-US fields 11 and 12, respectively, convey the bank and account information of the customer's check. These fields are already printed with MICR-readable characters when a customer begins a transaction. Currently, the AMOUNT field 14 is printed by the retailer or the customer's bank after the purchase transaction has occurred.

The flipping apparatus of this invention is hereinafter described with reference to the FIGS. 4 through 7. The flipping apparatus ensures that the customer's check 10 has the AMOUNT field 14 printed and, optionally, verified while the customer is still at the point of sale.

The POS printer 20 follows a certain sequence of actions for the sales transaction to be negotiated. The POS printer 20 first magnetize the ROUTING and ON-US fields 11 and 12, respectively. This can be accomplished either by a fixed magnet or within the MICR read head 22 itself. Next, the characters within the ROUTING and ON-US fields 11 and 12, respectively, are read by the read head 22. The signals are analyzed by the electronics (not shown) of the POS printer 20. This analysis can be followed by a verification step, wherein the printer 20 can electronically access the customer's bank to verify that sufficient funds are available to negotiate the transaction or, more typically, to compare to a list, maintained by the store itself, of good customers.

The printer can endorse the check on the back thereof and/or encode the check by printing MICR characters in the AMOUNT field on the face of the check, after verification is accomplished. Check encoding can be effected by utilizing impact/ribbon, laser/toner, inkjet, or thermal transfer. Thermal transfer printing can be either in parallel (full line) or in serial (one character at a time). For reasons of simplicity, the printer is preferred to contain a serial thermal transfer mechanism that provides MICR characters.

Once the check 10 is encoded, the POS printer 20 can then verify that the characters are readable by magnetizing and reading the encoded characters by flipping the check 10 a second time. The signals can then be analyzed and compared to the original transaction amount.

Figure 2:
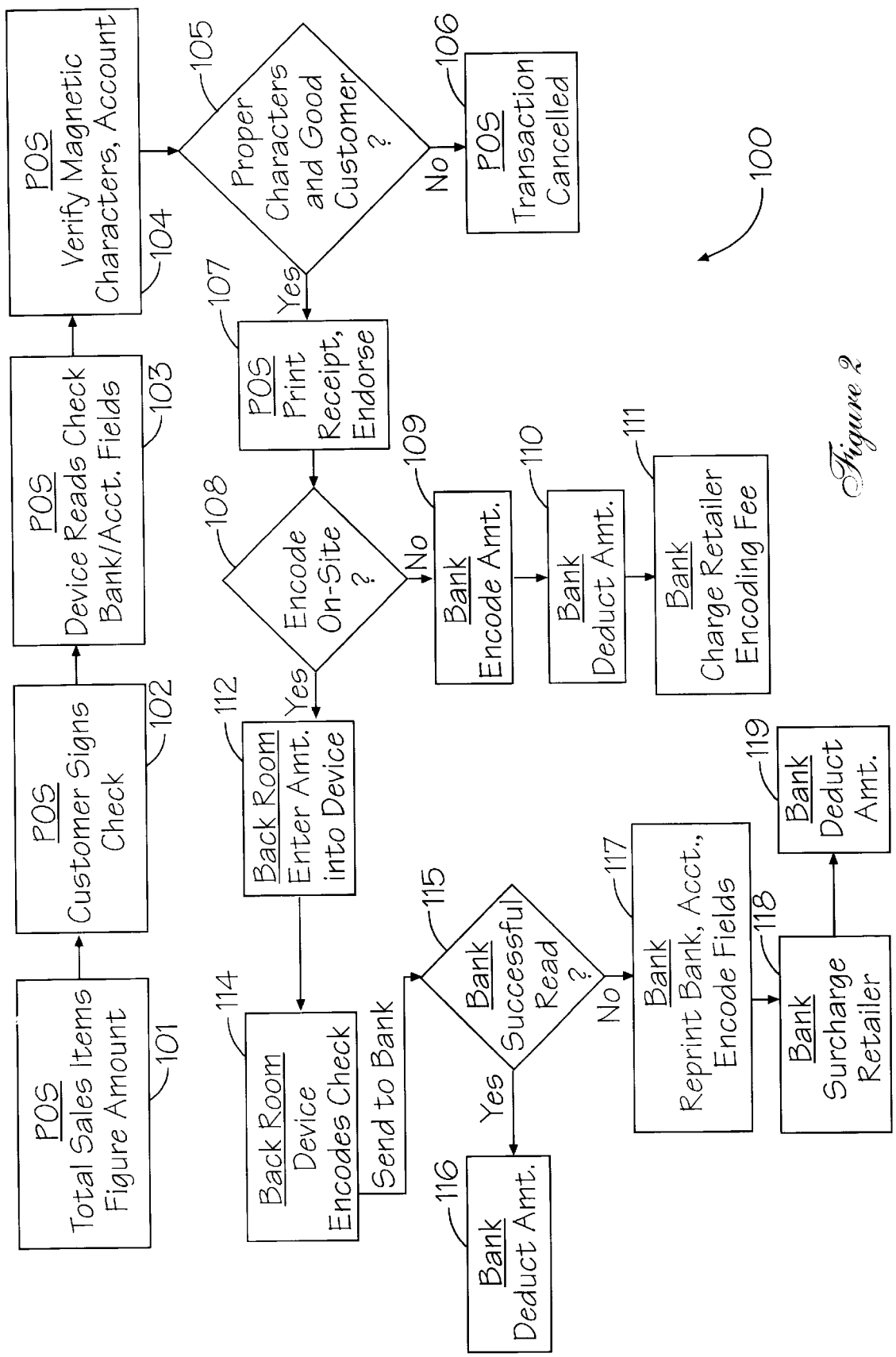
FIG. 2 depicts a flow diagram of a current check processing method.
Figure 3:
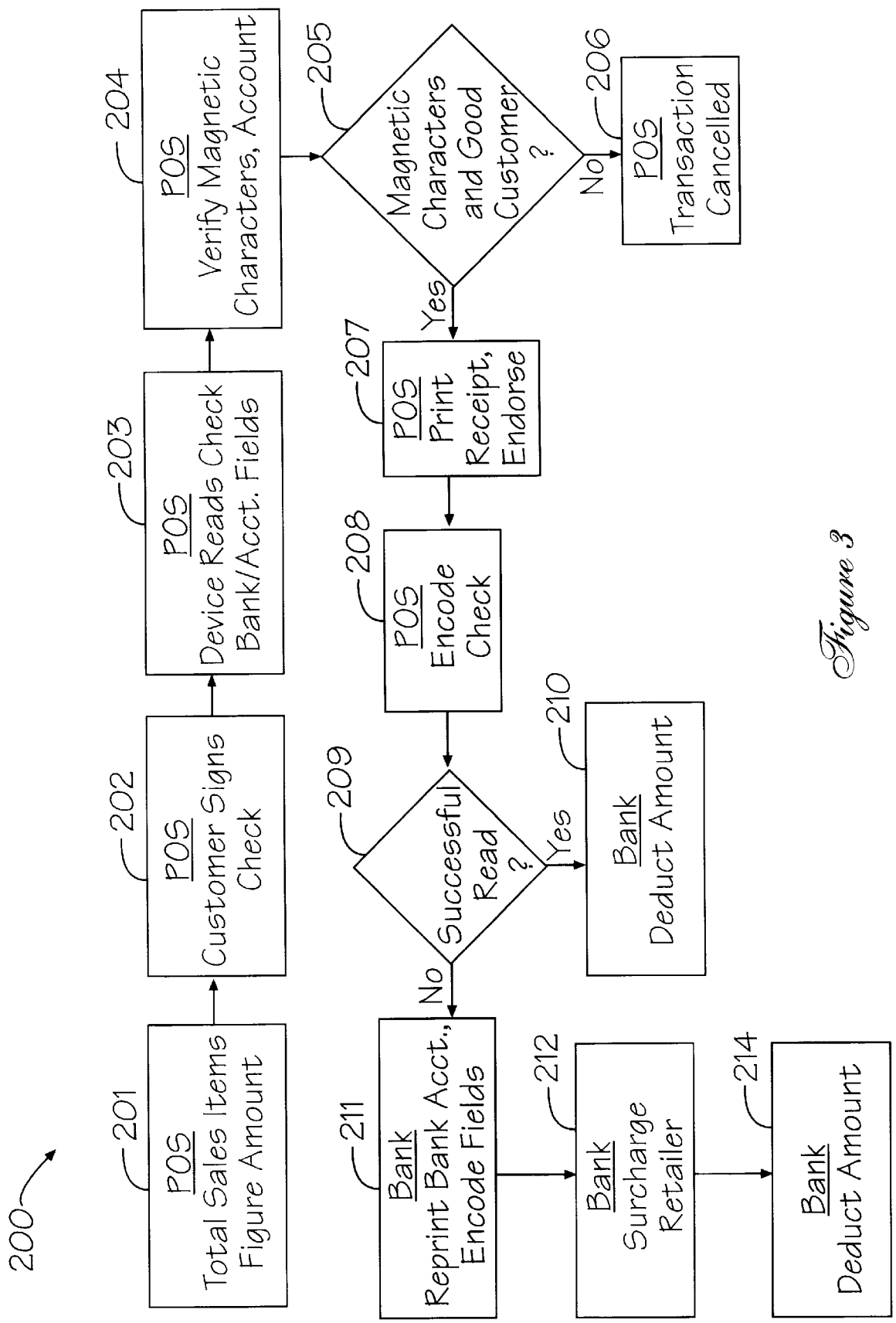
FIG. 3 shows a revised check processing method in accordance with the present invention.

Referring to FIGS. 2 and 3, flow charts 100 and 200, respectively, demonstrate the improved check handling sequence which the inventive POS encoding provides. The basic improvement is realized when the retailer or bank is not required to re-enter the amount on the check 10 in order to encode same. The flow chart 100 depicts the current procedure. At the point of sale, the sales items are totalled, and a figure amount of the transaction is provided, step 101. The customer then provides a personal check, and signs same, step 102. A device then reads the check, step 103, and optionally verifies whether the customer is credit worthy, step 104.

If the customer's check 10 is not good, step 105, or the proper fields or characters are not present, the transaction is canceled, step 106. If the transaction is in order, step 105, the check 10 is endorsed, and a receipt is printed, step 107.

If the retail establishment does not have an encoding machine in its back room, step 108, then the check 10 is sent to the bank for encoding, step 109. The bank deducts the amount of the transaction from the account of the customer, step 110, and it then charges the retailer an encoding fee, step 111.

When the retailer has its own encoding equipment, the check 10 is sent to the back room, where the amount is entered onto the check 10, step 112. The check is then encoded, step 114, and then sent to the bank. If the bank can successfully read the encoding, step 115, it deducts the transaction amount from the account of the customer, step 116. When the bank cannot decipher the encoding, step 115, the bank reprints the check with newly encoded fields, step 117. The bank then exacts a surcharge from the retailer, step 118, and deducts the amount of the transaction from the customer's account, step 119.

Referring to FIG. 3, a flow chart 200 illustrates the new transaction procedure in accordance with the invention. At the point of sale, the sales items are totalled, and a figure amount of the transaction is provided, step 201. The customer then provides a personal check, and signs same, step 202. A device then reads the check, step 203, and, optionally, verifies whether the customer is credit worthy, step 204.

If the customer's check 10 is not considered good or the proper fields or characters are not present, step 205, the transaction is canceled, step 206. If the transaction is in order, however, step 205, the check 10 is endorsed, and a receipt is printed, step 207. The POS printer 20 then encodes the check 10, step 208.

If the bank can successfully read the check 10, step 209, then the transaction amount is deducted from the customer's account, step 210. When the bank cannot decipher the check 10, step 209, then it reprints the check and encodes the necessary fields, step 211. The bank then exacts a surcharge from the retailer, step 212, and deducts the transaction amount from the customer's account, step 214.

The preferred method depicted in flow chart 200 requires that the MICR characters be printed serially. The printhead heating elements print a transverse column of dots, as the check is moved horizontally beneath the printhead, with its longest edge adjacent the printhead. The reading, verifying, and printing are accomplished in a single presentation of the check to the printer 20, as shown in FIGS. 4 through 7.

Figure 4:
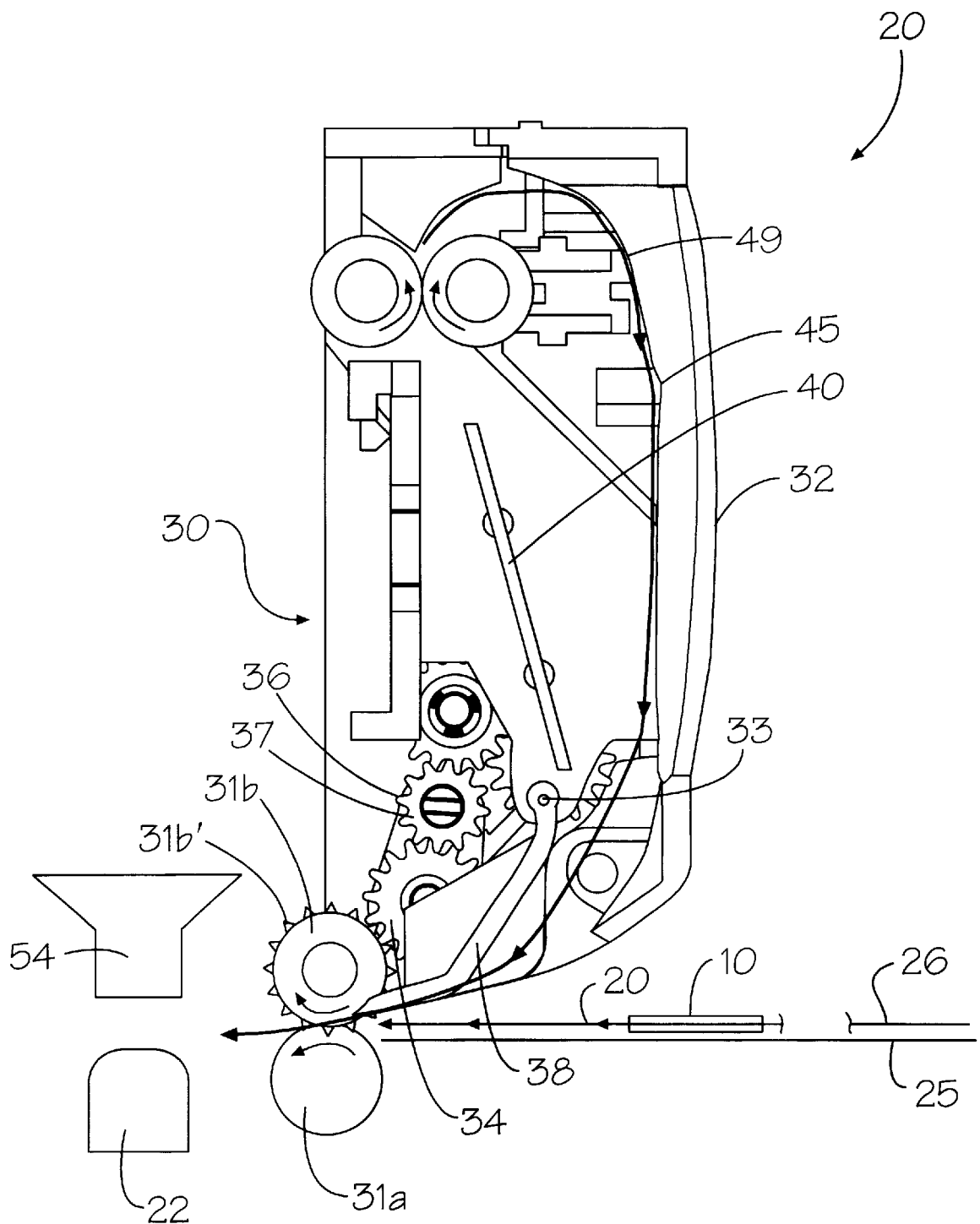
FIG. 4 illustrates a schematic, side view of the check flipping apparatus of this invention, with a check first entering the receipt printing machine.
Figure 5:
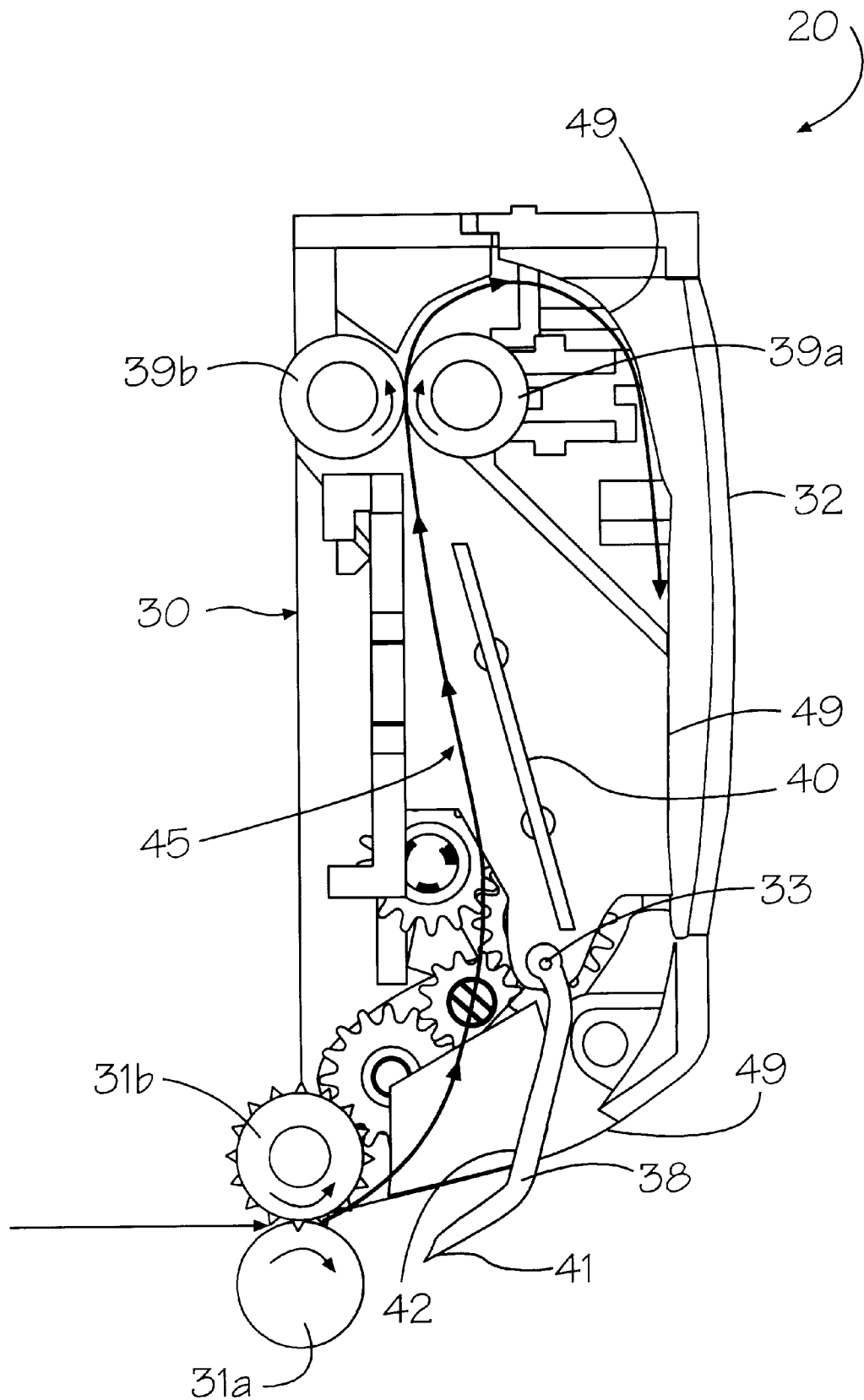
FIG. 5 depicts a schematic, side view of the check flipping apparatus shown in FIG. 4, with the check having been read and now entering the check flipping apparatus.

Referring to FIGS. 4 and 5, a check 10 is shown being fed (arrows 26) from the slip table 25 of the receipt printer 20 to a MICR read head 22, where the check 10 is read and verified by internal electronics (not shown). The printer 20 is shown in a left side view. The check flipping apparatus 30 of this invention is shown in sectional view. The check 10 is fed to the MICR read head 22 of the printer 20 by means of feed rollers 31a and 31b, respectively, whose rotational direction is indicated by their arrows. The flipping apparatus 30 is shown with a pivotable or "clamshell" door 32, shown here in its closed position. The upper feed roller or idler roller 31b is rotationally fixed to a gear 31b' that engages with gear 34 that is rotationally fixed to a first pulley, not shown. The first pulley is in rotational communication with pulley 36 via the garter spring drive 37. The fact that the aforementioned paper flipping apparatus 30 is disposed in the pivotable door 32 itself allows the operator to easily clear paper jams, if they occur, without removing components of the printer 20.

After the check 10 is read and, optionally, verified, feed rollers 31a and 31b reverse direction and push the check 10 past the MICR read head 22 towards the slip table 25. A solenoid, not shown, conneced by a mechanical linkage to a divert door 38, causes the divert door 38 to pivot about point 33. The tip 41 of the divert door 38 is caused to extend below the slip table 25. The check 10 is thus caused to ride up the divert door 38, the curved surface 42 of which directs the check 10 past the rear surface of transparent partition 40 and between drive pinch roller 39b and its corresponding idler pinch roller 39a, as shown by arrow 45. The check 10 continues to move in a curved loop, as shown by arrows 45, by virtue of the curved, inner guide wall 49. On its downward travel, check 10 moves in front of transparent partition 40. The facial orientation of the check 10, is thus reversed by the loop travel.

The check 10 now moves past an optical sensor, not shown. Electronic circuitry, not shown, is connected to the optical sensor for measuring the length of the check 10, as it moves into the printer 20. This measurement is useful for facilitating further paper handling operations. When the leading edge of check 10 passes the optical sensor, a signal is sent to the drive motor, not shown, to reverse the main feed roller 31a and its idler roller 31b, thus sending the facially-reversed check 10 forward again into the printer 20, past the printhead 54. The check 10 is now face up. The solenoid then causes the divert door kick-out arm to force the divert door 38 to reverse pivot back to the original position (FIG. 4). A small gap exists between the tip 41 of the door 38, and the lower guide wall 49, so that the check 10 can pass through to the printhead 54.

The check 10 now optionally receives the printed indicia from printhead 54. After printing has terminated, the primary feed rollers 31a and 31b reverse, and the check 10 is then discharged from the print machine 20.

Figure 6:
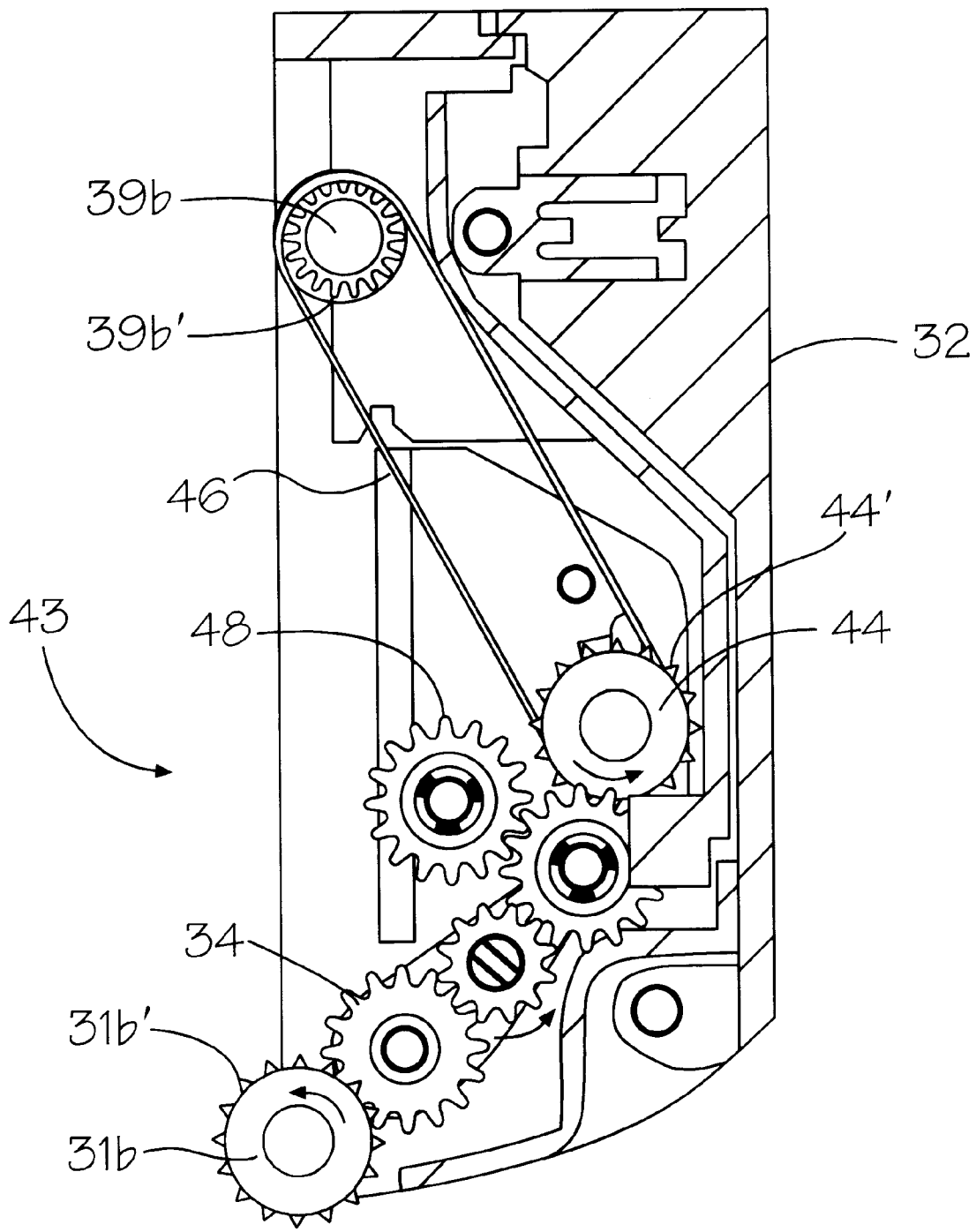
FIG. 6 shows a schematic, side view of the check flipping apparatus shown in FIG. 4, showing details of the gear toggle link configured to advance the check into the check flipping apparatus.
Figure 7:
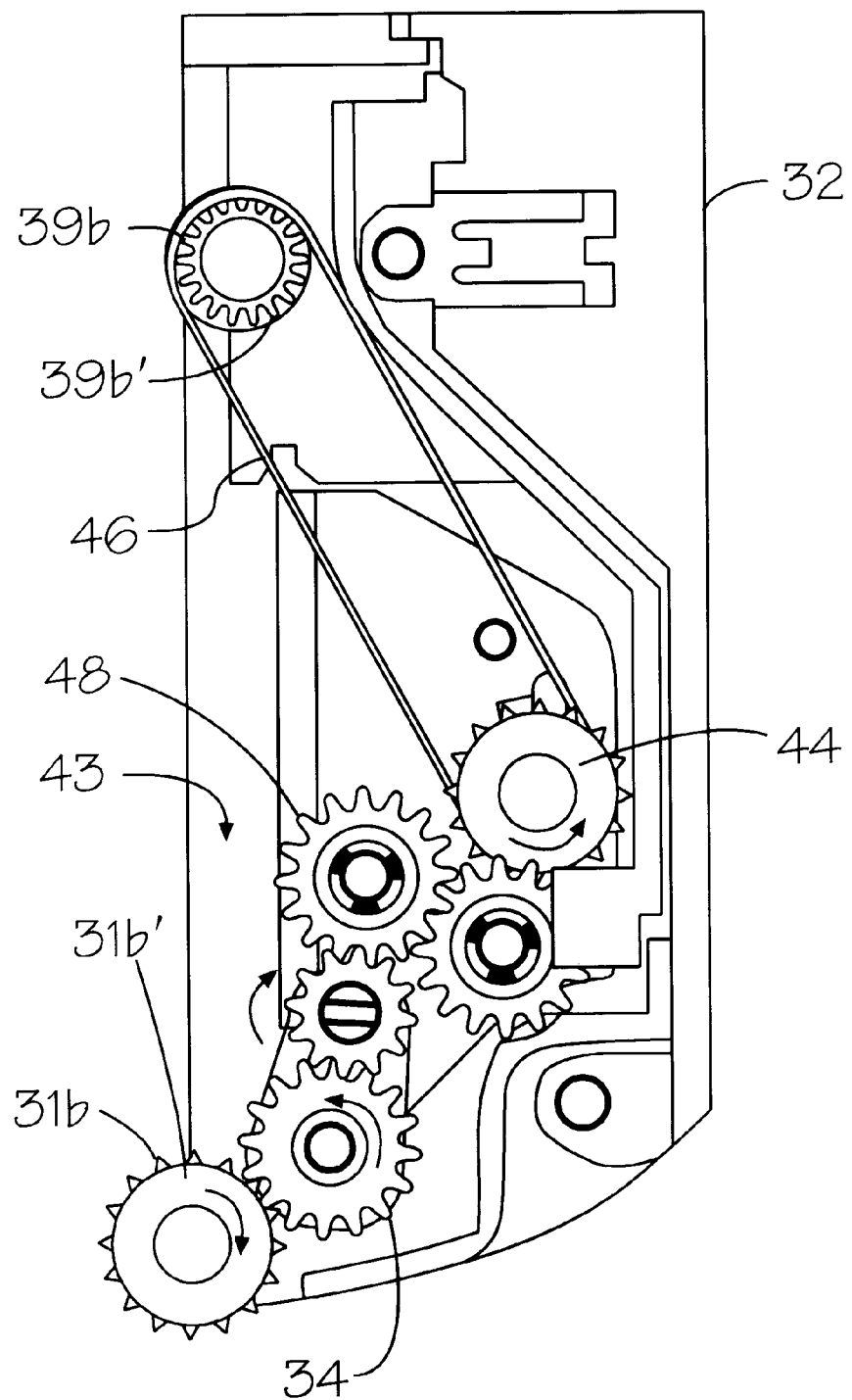
FIG. 7 illustrates a schematic, side view of the check flipping apparatus shown in FIG. 4, showing details of the gear toggle link configured to reverse the check so as to remove it from the check flipping apparatus.

Referring now to FIGS. 6 and 7, in order for check flipping apparatus 30 to operate in accordance with this invention, pinch rollers 39a and 39b must always rotate in the same respective directions (clockwise and counterclockwise, respectively) regardless of rotational direction of feed rollers 31a and 32b. A gear toggle link 43, consisting of either three or four gears, transmits motion between gears 31b and 44'. A second pulley 44 is rotationally affixed to gear 44', which, in turn, is connected, via timing belt 46, to toothed pulley (gear) 39b', rotationally affixed to pinch roller 39b. When gear 31b' moves in a counterclockwise direction (FIG. 6), the three gears linking gear 31b' to 44' cause gear 44' to rotate in a counterclockwise direction. Conversely, when gear 31b' moves in a clockwise direction (FIG. 7), the gear train 43 is modified by a suitable toggle mechanism, to include counterclockwise gear 48, thereby maintaining the counterclockwise rotation of gear 39b'.

Figure 8:
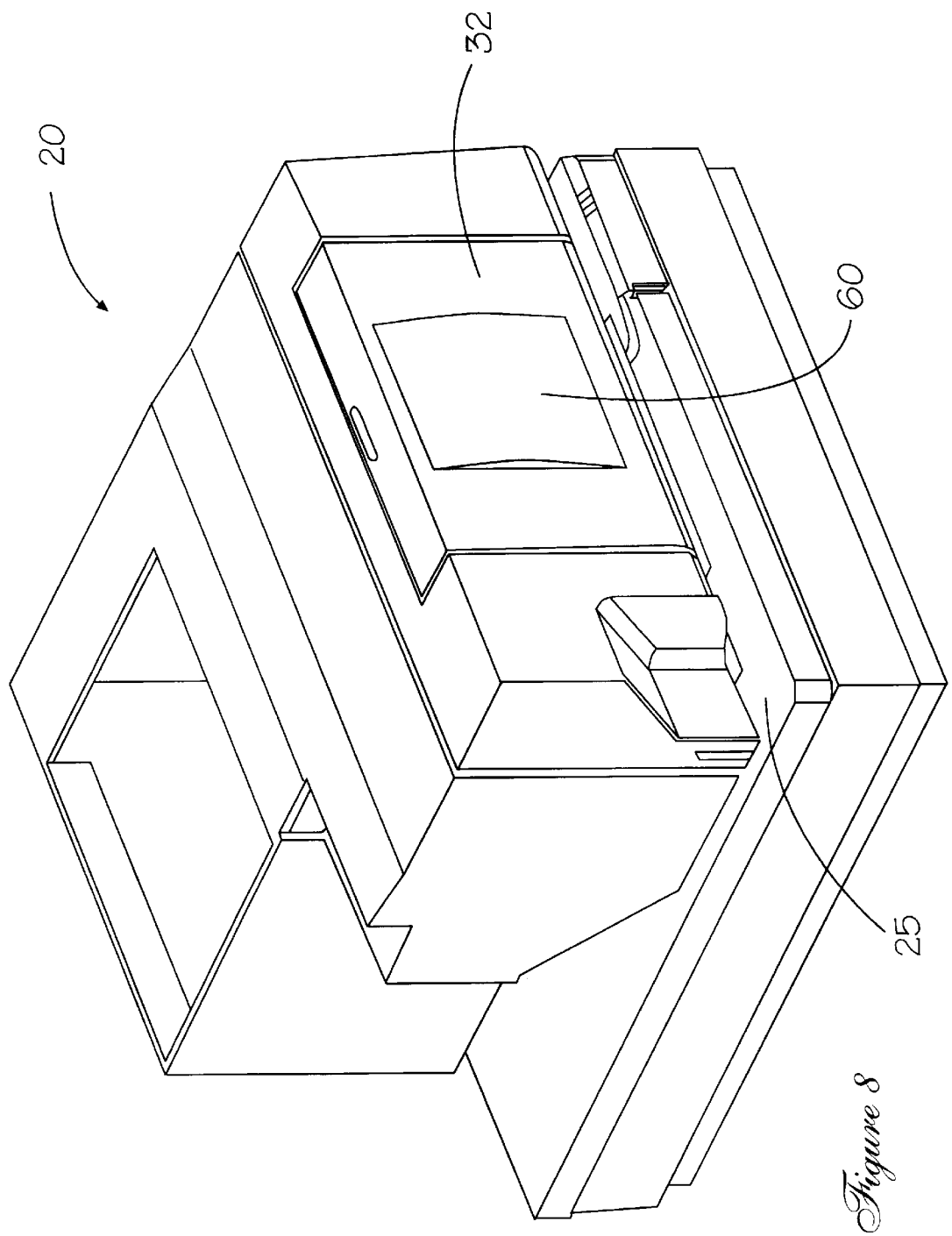
FIG. 8 is a perspective view of the printer in its operating orientation.

Referring now to FIG. 8, the printer 20 is shown in its operating orientation, with a window 60 disposed in pivotable door 32, so that the operator and customer can view the check (not shown) at all times as it is processed.

Figure 9:
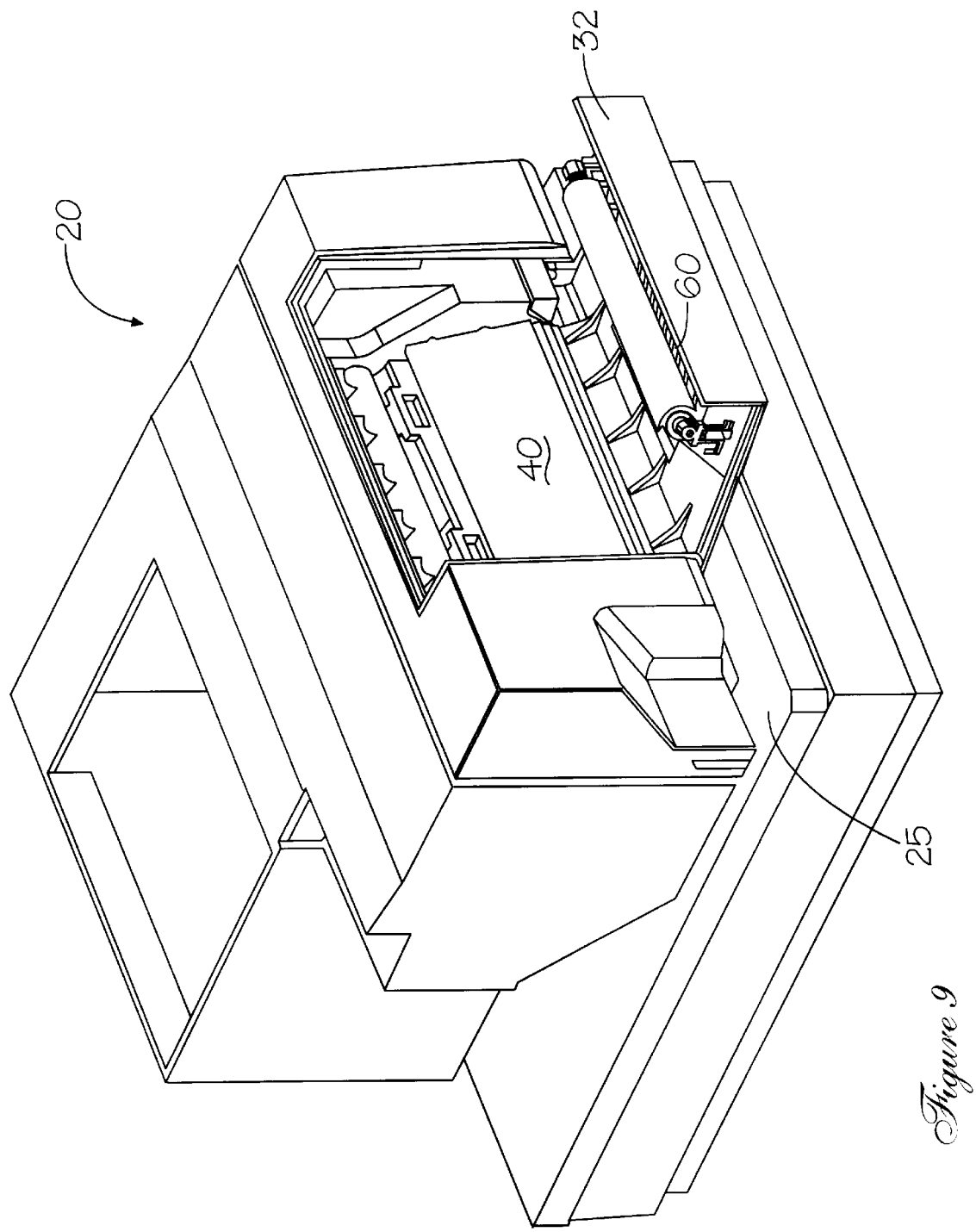
FIG. 9 is a perspective view the printer shown with its pivotable door in the open position.

Referring now to FIG. 9, the printer 20 is shown with pivotable door 32 in its open position, to allow for the operator to clear a paper jam, if it occurs.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A Point of Sale (POS) printer for reading, verifying, and printing MICR indicia upon a document in one presentation operation, comprising:
   a slip support for feeding a document into said POS printer with a given facial orientation;
   means defining a feed path within said POS printer;
   a read head supported by said POS printer and disposed along said feed path for reading MICR indicia of said check;
   a print head supported by said POS printer and disposed along said feed path for printing MICR indicia of said check; and document flipping means disposed along said feed path adjacent said read head for reversing said facial orientation of said document.

2. The POS printer in accordance with claim 1, further comprising:

an openable, clamshell, housing cover for permitting access to said document, by an operator, in the case of a paper jam.

3. The POS printer in accordance with claim 2, wherein said openable, clamshell, housing cover comprises a window for viewing said document at all times during paper handling operations.

4. The POS printer in accordance with claim 1, wherein said document comprises any one of the set of personal checks, payroll checks, business negotiable notes, European financial documents.

5. The POS printer in accordance with claim 2, further comprising document transport means disposed in said openable, clamshell, housing cover.

6. The POS printer in accordance with claim 1, further comprising sensing means for detecting the presence of said document as it is presented to said printer.

7. The POS printer in accordance with claim 6, further comprising means, operatively connected to said sensing means, for measuring the length of said document as it is presented to said printer.

8. A Point of Sale (POS) printer for printing MICR indicia upon a document in one presentation operation comprising:

a support for feeding a document into said POS printer with a given facial orientation; means defining a feed path within said POS printer;

MICR printing means disposed along said feed path;

an openable, clamshell, housing cover for permitting access to said document, by an operator; and flipping means disposed along said feed path for reversing said facial orientation of said document.

9. The POS printer in accordance with claim 8, wherein said openable, clamshell, housing cover comprises a window for viewing said document at all times during paper handling operations.

10. The POS printer in accordance with claim 8, wherein said read head comprises a MICR head.

11. The POS printer in accordance with claim 8, wherein said document comprises any one of the set of personal checks, payroll checks, business negotiable notes, European financial documents.

12. The POS printer in accordance with claim 8, further comprising document transport means disposed in said openable, clamshell, housing cover.

13. The POS printer in accordance with claim 8, further comprising sensing means for detecting the presence of said document as it is presented to said printer.

14. The POS printer in accordance with claim 13, further comprising means, operatively connected to said sensing means, for measuring the length of said document as it is presented to said printer.

15. A method of processing a document at the point of sale, comprising the steps of:

a) presenting a document to a document-processing apparatus with a given facial orientation, said document-processing apparatus having an openable, clamshell, housing cover for permitting access to said document by an operator;

b) feeding said document past a reading means within said document-processing apparatus in order to read MICR indicia printed on said document;

c) reversing said facial orientation of said document within said document-processing apparatus, and passing said check to a MICR printing means within said check processing apparatus, for printing MICR indicia thereupon; and d) discharging said document from said document-processing apparatus, whereby said MICR indicia of said check is read and printed in one document presentation operation.

16. A Point of Sale (POS) printer for reading, verifying, and printing MICR indicia upon a check in one check presentation operation, comprising:

a support for feeding a check into said Point of Sale printer with a given facial orientation;

means defining a feed path within said Point of Sale printer;

reading means supported by said Point of Sale printer and disposed along said feed path for reading MICR indicia of said check;

MICR printing means disposed adjacent said reading means and disposed along said feed path for printing MICR indicia upon said check; and flipping means disposed along said feed path adjacent said reading means and said printing means, for reversing said facial orientation of said check between reading and printing of indicia thereupon, in order that indicia of said check can be read, verified, and printed thereupon in one check presentation operation.

17. A receipt printer for reading, verifying, and printing MICR indicia upon a check in one check presentation operation, comprising:

a support for feeding a check into a Point of Sale printer with a given facial orientation;

means defining a feed path within said Point of Sale printer;

reading means supported by said Point of Sale printer and disposed along said feed path for reading MICR indicia of said check;

MICR printing means disposed adjacent said reading means and disposed along said feed path for printing MICR indicia upon said check;

driving means for driving said check within said receipt printer; and diverting means disposed along said feed path adjacent said reading means and said MICR printing means, said diverting means having a kick-out apparatus for capturing said check as it is being driven by said driving means for reversing said facial orientation and direction of said check between reading and printing of indicia thereupon, in order that indicia of said check can be read, verified, and printed thereupon in one check presentation operation.

* * * * *